No. 834,461. PATENTED OCT. 30, 1906.
A. A. FAIR.
END GATE FASTENING.
APPLICATION FILED MAR. 29, 1906.
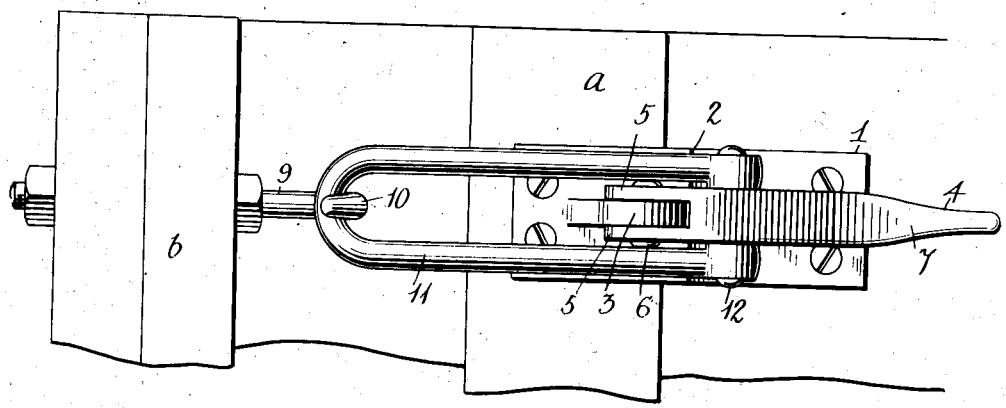
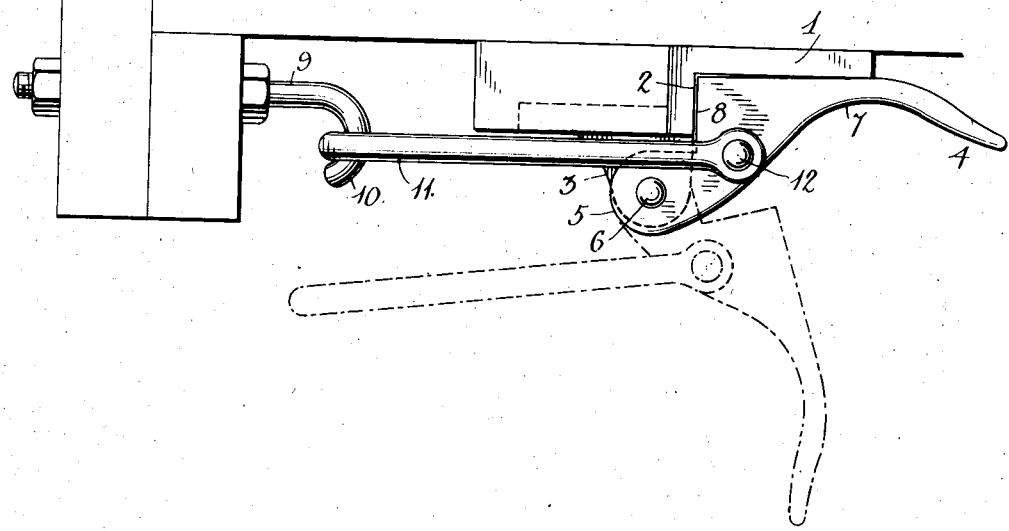
Witnesses
Inventor
Andrew A. Fair,
by
Attorneys

UNITED STATES PATENT OFFICE.

ANDREW A. FAIR, OF PIERSON, IOWA.

END-GATE FASTENING.

No. 834,461.

Specification of Letters Patent.

Patented Oct. 30, 1906.

Application filed March 29, 1906. Serial No. 308,726.

*To all whom it may concern:*

Be it known that I, ANDREW A. FAIR, a citizen of the United States, residing at Pierson, in the county of Woodbury and State of Iowa, have invented certain new and useful Improvements in End-Gate Fastenings; and I do declare the following to be a full, clear, and exact description of the invention, such as will enable others skilled in the art to which it appertains to make and use the same.

My invention relates to improvements in end-gate fastenings for wagons; and it consists in the construction, combination, and arrangement of devices hereinafter described and claimed.

The object of my invention is to provide an improved end-gate fastener which is extremely cheap and simple in construction, which is effective to securely lock the end-gate in place, and which may be readily operated to release and permit the removal of the end-gate.

In the accompanying drawings, Figure 1 is a rear elevation of a portion of the end-gate and body of a wagon provided with my improved fastening devices; and Fig. 2 is a top plan view of the same, showing the parts in position for securing the end-gate and showing the fastening in releasing position in dotted lines.

On the end-gate is secured a base-plate 1, which is formed with an offset to receive the cleat *a* of the gate and is formed with a shoulder 2. From the opposite portion of the base-plate projects a lug 3. A lever 4 has its inner end bifurcated, as at 5, to receive the lug 3 and is pivoted thereto by a pivot 6. The arm 7 of the said lever is formed on its inner side with a shoulder 8, adapted to bear on the outer portion of the base-plate and to also engage the shoulder 2 thereof. To one side *b* of the wagon-bed is secured a bolt 9, provided with a hook 10 at its inner end. A U-shaped link 11 has its arms pivotally connected at one end to the lever 4 by a suitable pivot 12, the arms of the said U-shaped link being astride of the said lever and the pivot 12 being located at a point between the pivot 6 and the shoulder 8 of the lever. The said link 11 may be engaged with the hook 10 of the bolt 9, and when the lever is swung to the closed position shown in Fig. 1 and in full lines in Fig. 2, with its shoulder 8 in engagement with the shoulder 2 of the base-plate, the link 11 will lie between said pivot 6 and shoulder 8, and hence will fasten the end-gate in place and will remain in such position owing to the leverage exerted thereon by the tension of the link. In order to release the end-gate, it is only necessary to turn the lever 4 outwardly, as shown in dotted lines in Fig. 2, when the link will be released from the hook-bolt.

From the foregoing description, taken in connection with the accompanying drawings, the construction, operation, and advantages of the invention will be readily understood without requiring a more extended explanation.

Various changes in the form, proportion, and the minor details of construction may be resorted to without departing from the principle or sacrificing any of the advantages of the invention, as defined by the appended claim.

Having thus described my invention, what I claim as new, and desire to secure by Letters Patent, is—

An end-gate fastener having a base-plate provided with a recess or step on its inner side to clear a gate-cleat and further provided on its outer side with a lug 3 and with a shoulder 2, in combination with a lever pivoted to said lug and having a shoulder 8 to engage the shoulder 2 of the base-plate, and a link to engage a device on one side of a wagon, said link being pivotally connected to the lever at a point between the pivot of said lever and the shoulder 8 thereof.

In testimony whereof I have hereunto set my hand in presence of two subscribing witnesses.

ANDREW A. FAIR.

Witnesses:
ANDREW F. IRWIN,
WIER R. MILLS.